United States Patent [19]

Liang

[11] Patent Number: 5,249,265
[45] Date of Patent: Sep. 28, 1993

[54] STRUCTURE STORAGE MANAGEMENT IN A GRAPHICS DISPLAY DEVICE

[75] Inventor: Nina Y. Liang, West Hurley, N.Y.

[73] Assignee: International Business Machines Corporation, Armonk, N.Y.

[21] Appl. No.: 987,983

[22] Filed: Dec. 9, 1992

Related U.S. Application Data

[63] Continuation of Ser. No. 426,618, Oct. 24, 1989, abandoned.

[51] Int. Cl.⁵ ............... G06F 3/14; G06F 12/00; G06F 15/40
[52] U.S. Cl. ................... 395/160; 395/164; 395/166; 395/400; 395/600
[58] Field of Search ............... 395/133, 160, 164, 166, 395/400, 425, 600, 157, 158

[56] References Cited

U.S. PATENT DOCUMENTS

| | | |
|---|---|---|
| 4,862,392 | 8/1989 | Steiner . |
| 4,903,218 | 2/1990 | Longo et al. . |
| 4,908,759 | 3/1990 | Alexander, Jr. et al. ....... 364/200 X |
| 4,928,247 | 5/1990 | Doyle et al. .................. 364/518 |
| 4,944,034 | 7/1990 | Ohsawa ....................... 364/522 |
| 4,961,139 | 10/1990 | Hong et al. ................... 364/200 |
| 4,967,375 | 10/1990 | Pelham et al. ................ 364/200 X |
| 5,027,291 | 6/1991 | Callahan et al. . |
| 5,027,316 | 6/1991 | Frantz et al. ................. 364/900 |
| 5,036,473 | 7/1991 | Butts et al. . |
| 5,056,045 | 10/1991 | Ohsawa ....................... 364/522 |
| 5,097,411 | 3/1992 | Doyle et al. .................. 395/600 |
| 5,119,477 | 6/1992 | Ebbers ........................ 395/160 |
| 5,182,797 | 1/1993 | Liang et al. .................. 395/164 |

Primary Examiner—Joseph L. Dixon
Assistant Examiner—Michael A. Whitfield
Attorney, Agent, or Firm—William A. Kinnaman, Jr.; Mark S. Walker

[57] ABSTRACT

A graphics data management system that includes control tables for quickly accessing information about the display structures to be drawn. A series of control tables and hashed indexes to graphics descriptors allow structure storage editing commands to quickly and effectively edit structure details. A hierarchical graphics data language results in a hierarchical network of structure elements and associated graphic primitive commands. The editor provides a method to preserve the hierarchy while efficiently accomplishing editing tasks. Hashing tables to the structure I.D., pick I.D., label I.D. and a chained list of execute structures are maintained to rapidly access and control those elements. Structure storage is maintained in local memory with certain portions shared with the graphics control processor.

9 Claims, 6 Drawing Sheets

STRUCTURE STORAGE MANAGEMENT IN A GRAPHICS DISPLAY DEVICE

CROSS-REFERENCE TO RELATED APPLICATION

This application is a continuation of application Ser. No. 07/426,618, filed Oct. 24, 1989, now abandoned.

BACKGROUND OF THE INVENTION

1. Field of the Invention

This invention relates to information handling systems for processing graphical data and in particular, to graphics display systems for processing graphics data stored as a hierarchical structure of graphics display elements. More particularly, this invention relates to the management of graphics display data elements in a graphics display device.

2. Background Information

Graphics display systems used in the area of computer aided design (CAD), and computer aided engineering (CAE) display images created based upon graphics orders entered into the system. The graphics orders define objects in terms of attributes such as color and primitive drawing operations for, e.g. a line, point, or polygon. Complex graphical images can be represented or modelled as a combination of graphical primitives. Modern graphics display systems implement hierarchical graphics data model to allow a single low level object definition or sequence of definitions to be repetitively used to express a more complex object. Thus, for example, a primitive definition of a single wheel may be entered into the graphics display system and then used repetitively to define the wheels of an automobile on a computer aided design application.

Emerging standards for graphics system programming, e.g. PHIGS (Programmer's Hierarchical Interactive Graphics System), provides a set of functions for the definition, display, and manipulation of graphical data and geometrically related objects. An interface standard such as PHIGS allows a particular graphics application program to be written at a high level without concern for the detailed implementation in a particular graphics display system. The use of this higher level language allows application programs to be transferred between various types of equipment with only minor modification.

The logical data flow of a system employing a hierarchical data structure is presented in FIG. 1. User application program 100 passes a data stream 102 containing the graphics interface commands to a graphics processing system. The data stream information is divided into two categories: structure storage 104 and workstation state list 106. Structure storage 104 contains the detailed descriptions of the graphics elements to be displayed while workstation state list 106 contains information necessary to establish the workstation environment. A workstation program operating on the structure storage and workstation state list produces the final image to be generated on the display surface 108.

An example of a hardware architecture used to implement this form of graphics display system is shown in FIG. 2. Communications processor 110 provides an interface to a host system containing graphics orders and, potentially, the user applications program in graphical database. System control processor 112 manages the geometric database and controls the overall operations of the graphics display system. The system control processor will be discussed in greater detail below. Graphics command processor 114 interprets the graphics commands placed in the system memory 113 by system control processor 112 and generates the detailed commands required by display processor 116 containing the associated geometric processing unit 118 and rendering unit 120. The final outputs of the display processor are pixel definition signals sent on line 122 to the frame buffer for display on a display device.

The operation of the multiprocessor system described above is presented in greater detail in application Ser. No. 07/425,891, now U.S. Pat. No. 5,182,793 entitled "A Multiprocessor Graphics Display System for Displaying Hierarchical Data Structures", filed Oct. 23, 1989. The system control processor 112 is responsible for maintaining the structure storage list 104 in system memory 113 in response to operator editing requests. The system control processor is connected to an I/O processor 124 that processes data from various operator control devices such as a keyboard 126, stylus and tablet 128, or program function keys 130. The operator uses these devices to communicate with the graphics display system and to perform editing and update tasks on the graphics objects.

Systems for handling operator interaction must be able to rapidly access operator referenced data and to quickly and efficiently implement the modifications requested by the operator. As the capacity of graphics display systems has increased and the models have become increasingly large, prior art methods of data location and update have become ineffective. Current methods for accessing structure storage information have become too slow to support the real time operator interaction demanded by system users.

SUMMARY OF THE INVENTION

The present invention is directed to providing a structure storage database structure and management method to allow increased efficiency of operator interaction with the structure store. The present invention employs novel data management techniques to speed the access and update of hierarchcally structured graphics orders.

It is therefore an object of the present invention to provide a structure storage organization that allows rapid access to referenced data structures.

It is a further object of the invention to provide a structure storage management process that allows editing and update of the structure storage without corrupting the hierarchical organization. These and other objects of the invention will be satisfied by the method disclosed in greater detail in the Description of the Preferred Embodiment.

DETAILED DESCRIPTION OF THE PREFERRED EMBODIMENT

Figure 1:
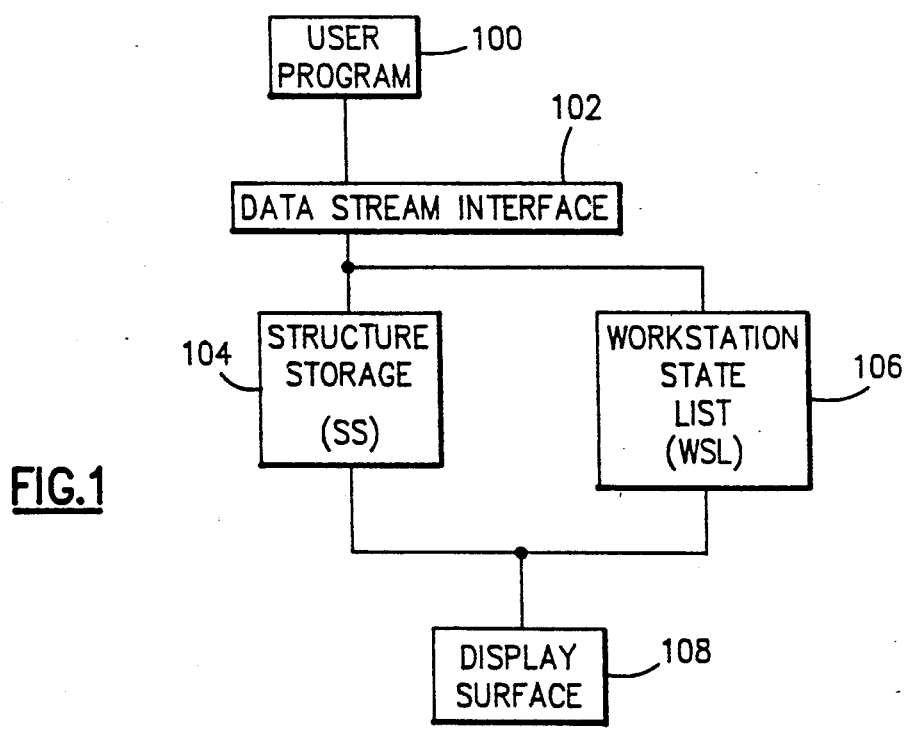
FIG. 1 is a block diagram showing the data flow in a display system employing the present invention.
Figure 2:
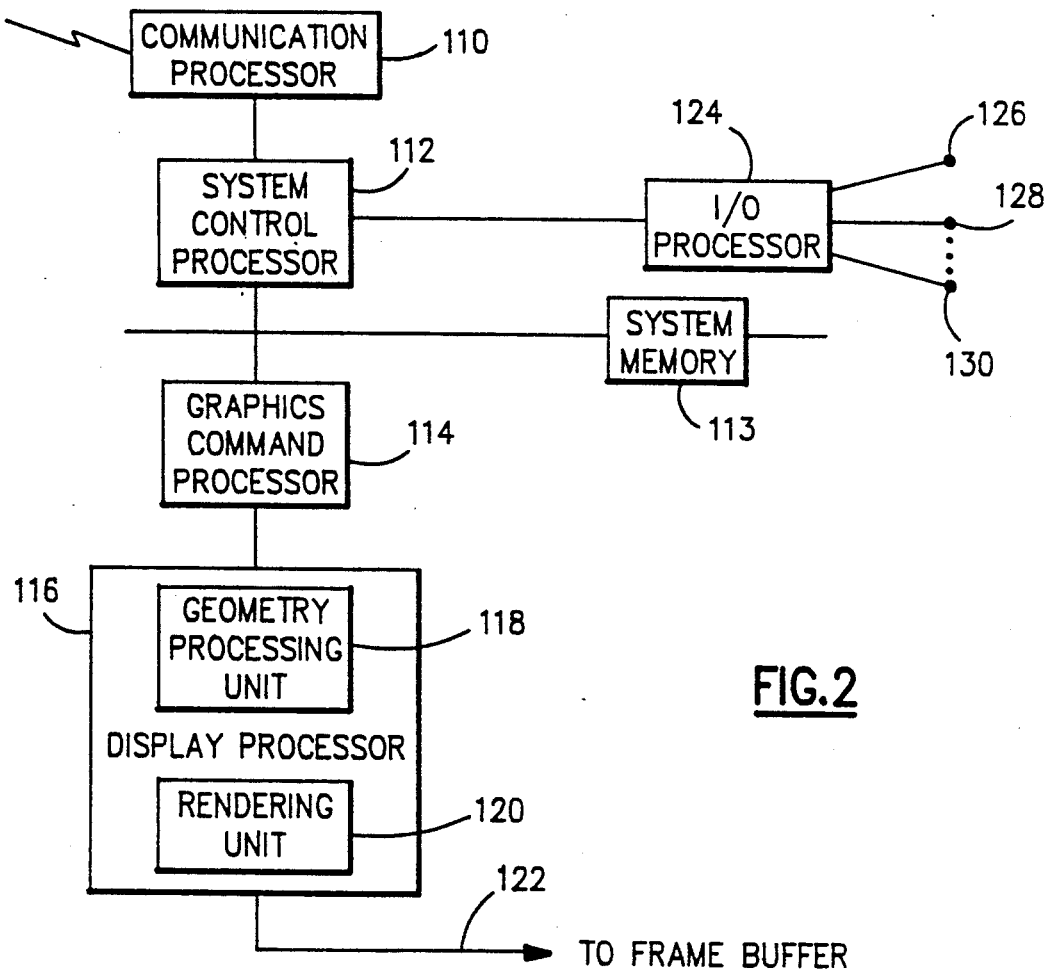
FIG. 2 is a block diagram illustrating a graphics display system incorporating the present invention.
Figure 3:
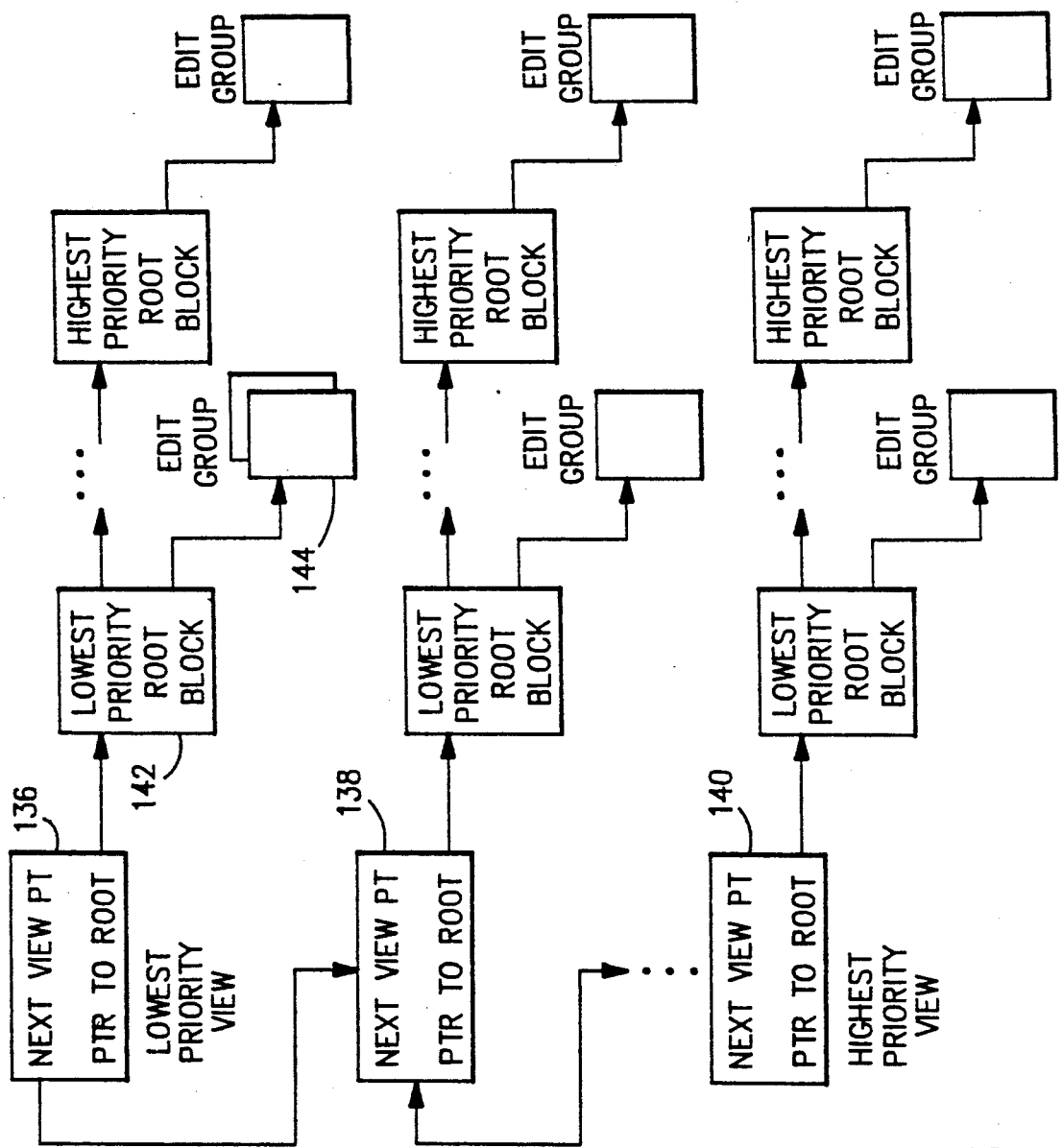
FIG. 3 is a block diagram showing the hierarchical relationship between graphic data elements.

A hierarchical graphics description language, such as PHIGS, contains a series of hierarchically related structure elements. The image on a display device is comprised of a series of views or windows each containing a particular image or set of images. The relationship among the structure elements will be described with reference to FIG. 3. Each view of a display has a view pointer, for example, elements 136, 138, and 140 in FIG. 4. Each view contains a pointer to the next higher priority view. The view also contains a pointer to the first root block for that view. A root block is the anchor point for a series of edit groups that together make up an object or portion of an object in the display. For example, view pointer 136 points to root block 142 that in turn points to edit group 144. Each root block also has a pointer to the next highest priority root block with its associated edit groups.

The process of image generation involves a traversal of the structures pointed to by the view, root, and edit group. These structures are processed from lowest priority to the highest priority so that the final image is that of the highest priority objects.

Figure 4:
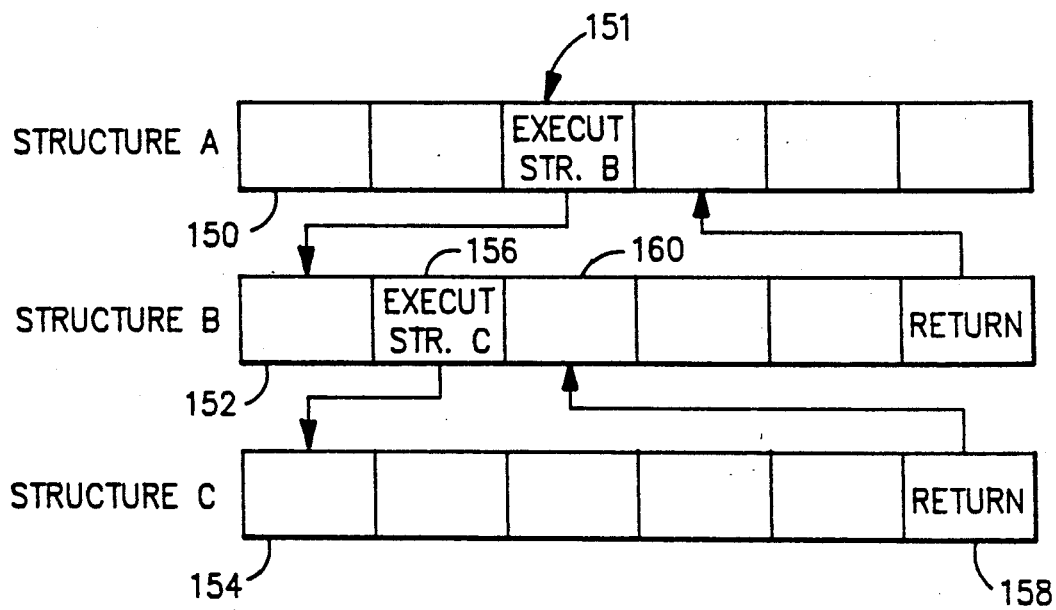
FIG. 4 is a diagram illustrating the hierarchical relationship between structures.

At the lowest level, a series of "structures" that are executed to form the required object on the display device. Each structure is comprised of one or more identifiers, basic drawing primitives, and calls to other structures. The ability of a structure to execute another structure allows the establishment of a hierarchical relationship among the structures. For example, FIG. 4 illustrates the relationship between a set of structures. Structure A (150) performs a series of basic operations (in the blank boxes) and then executes structure B (152). The "execute structure B" command 151 is contained as an element of structure A. Structure B in turn executes structure C (154) by means of "execute structure C" command 156. When structure C has completed processing the "return" command 158 returns control to structure B 152 to the point following execute structure command 156, i.e., 160. The completion of structure B control returns control to structure A for the completion of processing.

Figure 5:
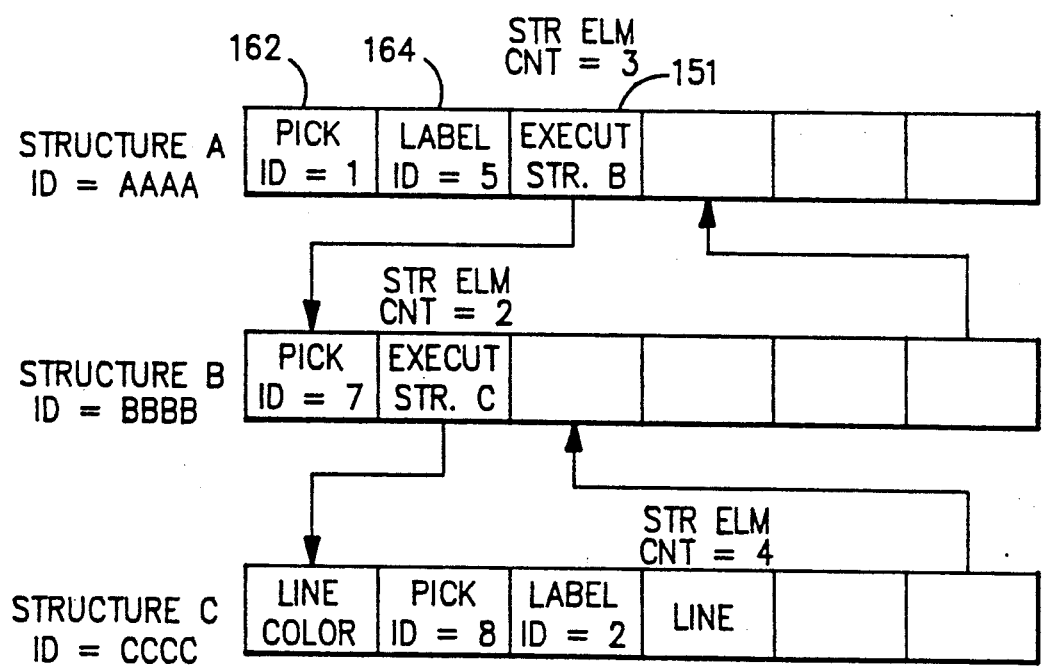
FIG. 5 is a block diagram illustrating the identification of the structure element.

FIG. 5 illustrates the identifying elements associated with each structure. Each structure has a unique arbitrary structure identifier to identify that structure. In addition, the structure may contain a non-unique pick I.D. 162, a non-unique label I.D. 164. The pick I D. is established and used by the application program to identify an operator-selected object during pick detection processing. The label I.D. 164 contains the label associated with the structure by an application program. The label I.D. allows the application program to identify those structure elements in a group defined by the application. Since the unique structure identifier is system assigned and is not always conveniently manipulated by the application program, the label I D. field provides increased flexibility to the application. Each structure element in the structure is identified by a structure element number. For example, in FIG. 5 the command "execute structure B" 151 is structure element number 3 in structure AAAA. The structure element counter can be used to locate a particular structure element within the larger structure.

Figure 6:
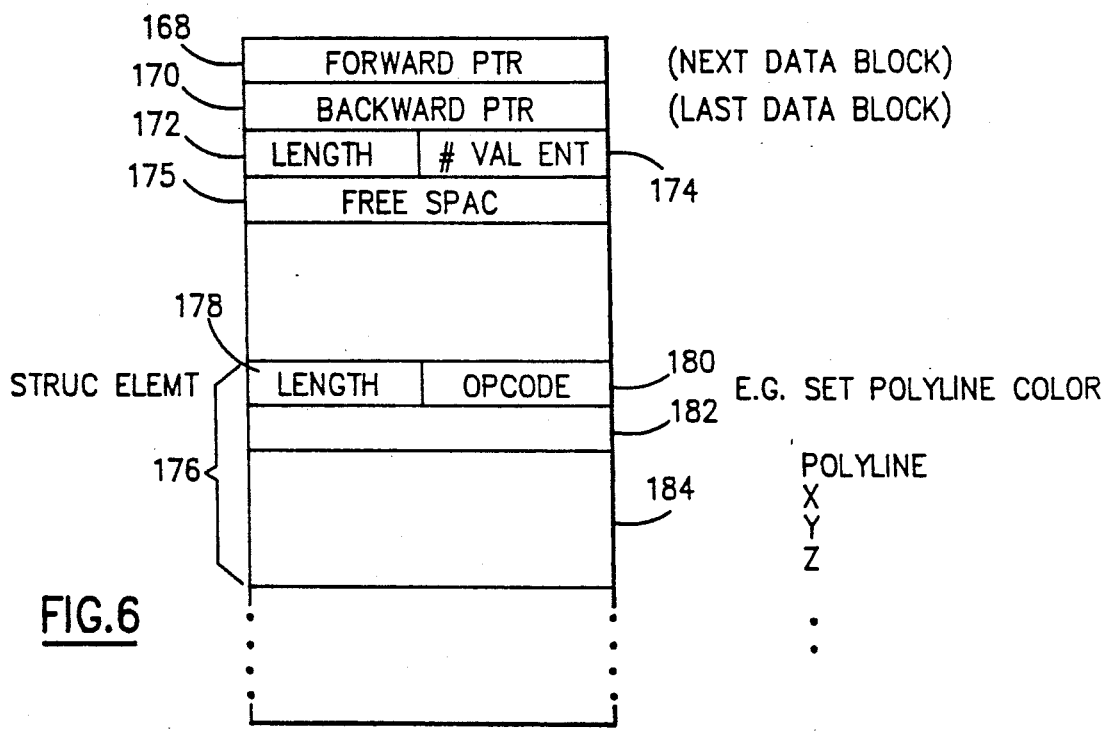
FIG. 6 is a diagram illustrating the content of an edit block.

The preferred embodiment of the present invention is implemented using one or more edit blocks to represent each structure. A structure descriptor table contains basic structure identification information and a pointer to the first edit block of the structure. Each edit block is structured as shown in FIG. 6. Forward pointer 168 points to the next edit block, if any, in the structure. Similarly, the backward pointer 170 points to the prior edit block or to the structure descriptor if this is the first edit block. The length 172 of the edit block is stored next with the number of valid entries 174. Field 175 contains the amount of free space remaining in the edit block.

Each structure element 176 is stored in a contiguous section of the edit block. The structure element contains length information 178 and operation code, opcode 180, and individual pieces of data 182, 184. For example, a command to draw a polyline would begin with a given length, an opcode indicating that a polyline is to be drawn, and then would be followed by coordinate values defining the polyline. These each would be passed as X, Y and Z values for each vertex of the polyline. The structure element format is repeated for each structure element within the particular structure. If the sum of the lengths of all structure elements exceeds the size of the edit block, in the preferred embodiment 64,000 bytes, a second edit block is created to contain the additional structure elements. This second and any subsequent edit blocks are chained to the proceeding edit blocks and to the structure descriptor with forward and backward pointers.

The system according to the present invention implements a set of control tables to allow rapid access to the data contained in the structures and associated edit blocks. In the preferred embodiment, certain tables are required only by the system control processor, while others require access by both the system control processor and the graphics control processor. The memory, however, need not be split in this way.

The control tables in local system control program memory include:

Structure descriptors
Structure I.D. hashing table
Pick I.D. element blocks
Pick I.D. hashing table
Label I.D. element blocks
Label I D. hashing table
Reference structure list.

The tables in global memory shared by the system control processor and graphics control processor include:

Execute structure list
Edit block list
Edit block address table.

These control tables provide the rapid access to structure elements necessary to accomplish the editing and database maintenance of the graphics image. A description of these control tables follows.

As discussed above, each structure in the model has a structure descriptor which contains specific information for that structure. The structure descriptor is created by the structure management when an open structure procedure is processed or an execute structure element is encountered. The structure descriptor contains Next structure descriptor
Previous structure descriptor pointer
Structure I.D.
Pointer to edit block address list
Pointer to pick block table
Pointer to label block list
Pointer to execute structure block list (EXSL)
Pointer to reference structure block list (REFL)
Total number of structure elements
Associated view bit map (indicating the views to which the structure has been associated.)

Figure 7:
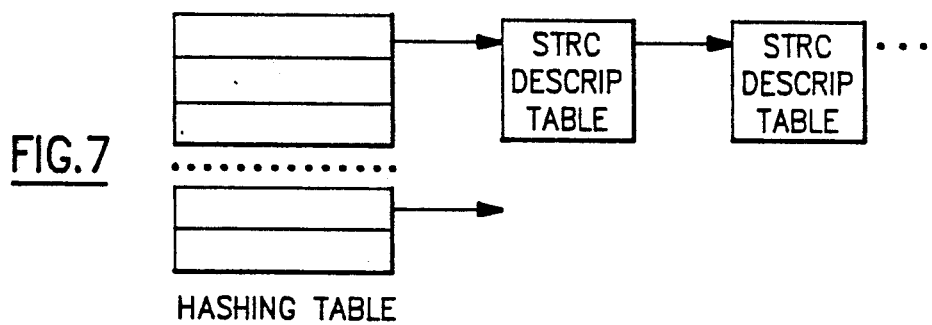
FIG. 7 is a diagram illustrating the relationship between a hashing table and structure descriptors.

A structure hashing table is provided containing pointers to each of the structure descriptors in the workstation structure network. This table is hashed based on the structure I.D. and allows the application or system to access rapidly a structure based on the structure I.D. The structure I.D. hashing table contains pointers to the beginning of a structure descriptor chain of all structures hashed to the same entry with each structure descriptor pointing to the following structure descriptor. (See FIG. 7.)

An Execute Structure Element Block exists for each execute structure element. The storage manager creates the block when an execute structure command is first processed. All execute structure element blocks for a specified structure are doubly linked to form the execute structure list (EXSL) for that structure. In addition, the block is linked into the reference structure list (REFL) for the execute structure. The execute structure block contains:

Next execute block address
Previous execute block address
Address of edit block containing the execute structure element
Address of the execute structure element entry
Address of the structure descriptor of the calling structure
Address of the structure descriptor of the execute structure
Next execute block in REFL chain
Previous execute block in REFL chain.

The reference structure list contains the information about all structures that reference a specified structure and shares the same execute element block of the calling structure. For example, if structure A executes structure B, the storage manager will create an execute structure element block for B and chain it to the EXSL (execute structure list) of A. This block will also be chained to the REFL (reference structure list) of structure B.

Figures 8A, 8B:
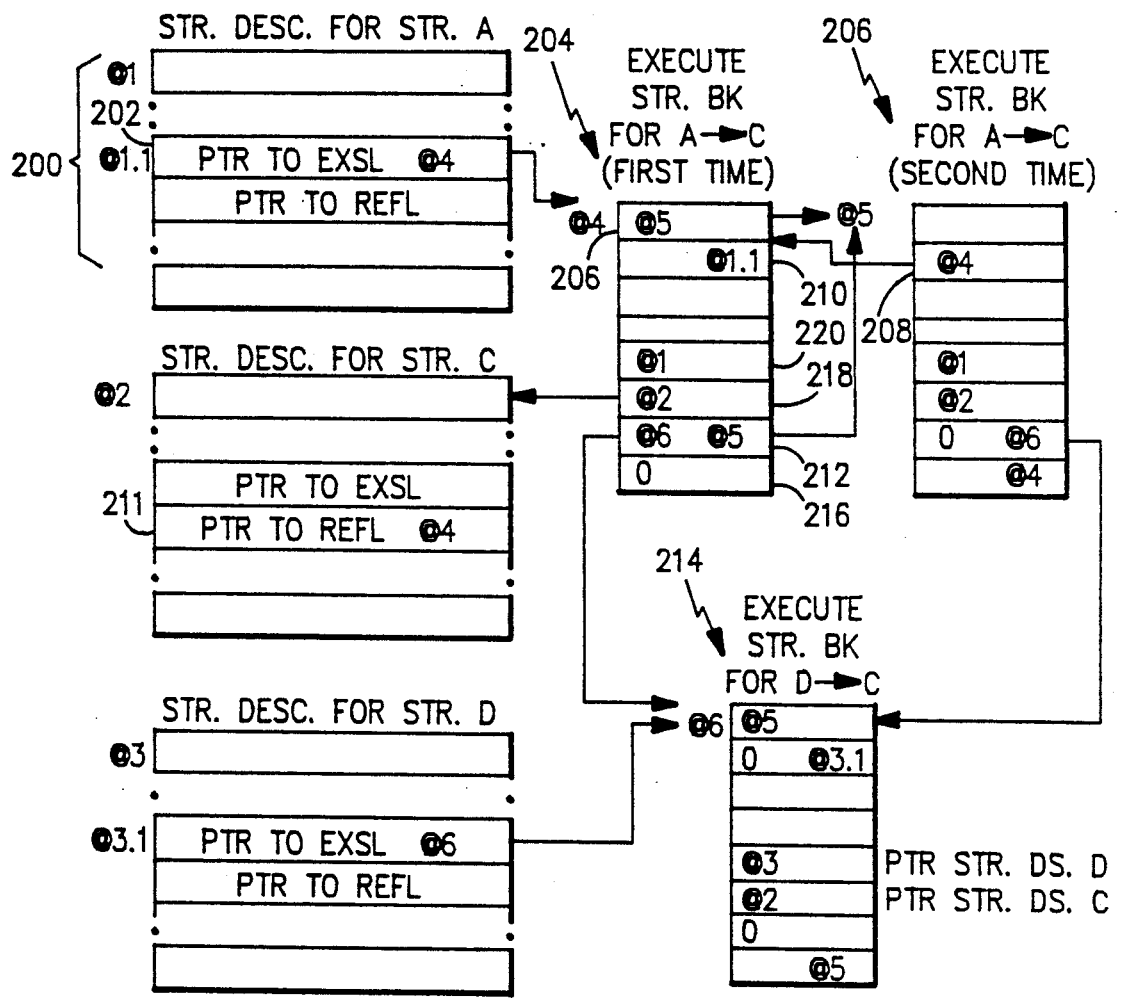
FIG. 8a is a diagram illustrating the relationships between structures in an example view.
FIG. 8b is a memory diagram illustrating the interrelationships between memory structures according to the present invention.

FIG. 8a shows the hierarchical relationship between structure A, structure D and two instances of structure C. FIG. 8b shows, in detail, the relationship between the structure descriptors and execute structure blocks for this example. Structure descriptor for structure A is shown at 200 beginning at address @1. The structure descriptor contains a pointer 202 to the execute structure element block (EXSL) 204 at address @4. The execute structure block 204 for the first execution of structure C by structure A is shown at 204. Because structure C is executed by structure A a second time "next execute block pointer" 206 points to the address of the second execute structure block for structure C, @5. Backward pointer 208 from execute structure block 206 points to execute structure block 204. A backward pointer 210 points to the address of the EXSL pointer 202 of calling structure descriptor A.

The reference structure list pointers are contained in the execute structure blocks. The REFL pointer from structure C, 211, points to the first EXSL to reference Structure C, i.e. EXSL 204. The forward REFL pointer 212 in execute structure block 204 points to next execute structure block 206 representing the second execution of structure C by structure A. The REFL pointer of EXSL 206 points to EXSL 214, the execution of structure C by structure D. The null backwards REFL pointer 216 indicates that there is no previous execute block in the REFL chain. Address pointer 218 indicates the address of the structure descriptor of the execute structure, in this case the structure descriptor for structure C at address @2. Address locator 220 contains the address of the calling structure descriptor.

Each pick I.D. has a pick I.D. element block pointed to by the pick element pointer in the edit block. Content of the pick I.D. element block is:

next pick block in hashing chain
previous pick block in hashing chain
next pick block in structure pick chain
previous pick block in structure pick chain
structure I.D.
pick I.D.
corresponding edit block address
corresponding edit block entry address.

The pick I.D. element blocks are connected into a pick I.D. hashing table. Like the structure descriptor table, the pick I.D. hashing table has, in the preferred embodiment, a fixed sized table. Each entry contains either a pointer to a pick I.D. hashing chain, or zero, which indicates that no hashing chain exists in this hash entry. The pick I.D. is hashed according to the combined structure I.D. and pick I.D. for that structure element.

A similar label I.D. element block and label I.D. hashing table are created which correspond to the pick I.D. element block and pick I.D. hashing table.

The pick I.D. element blocks for each structure are chained together to form a "pick element block list". Similarly, the label I.D. element blocks are chained to form a "label element block list".

Figure 9:
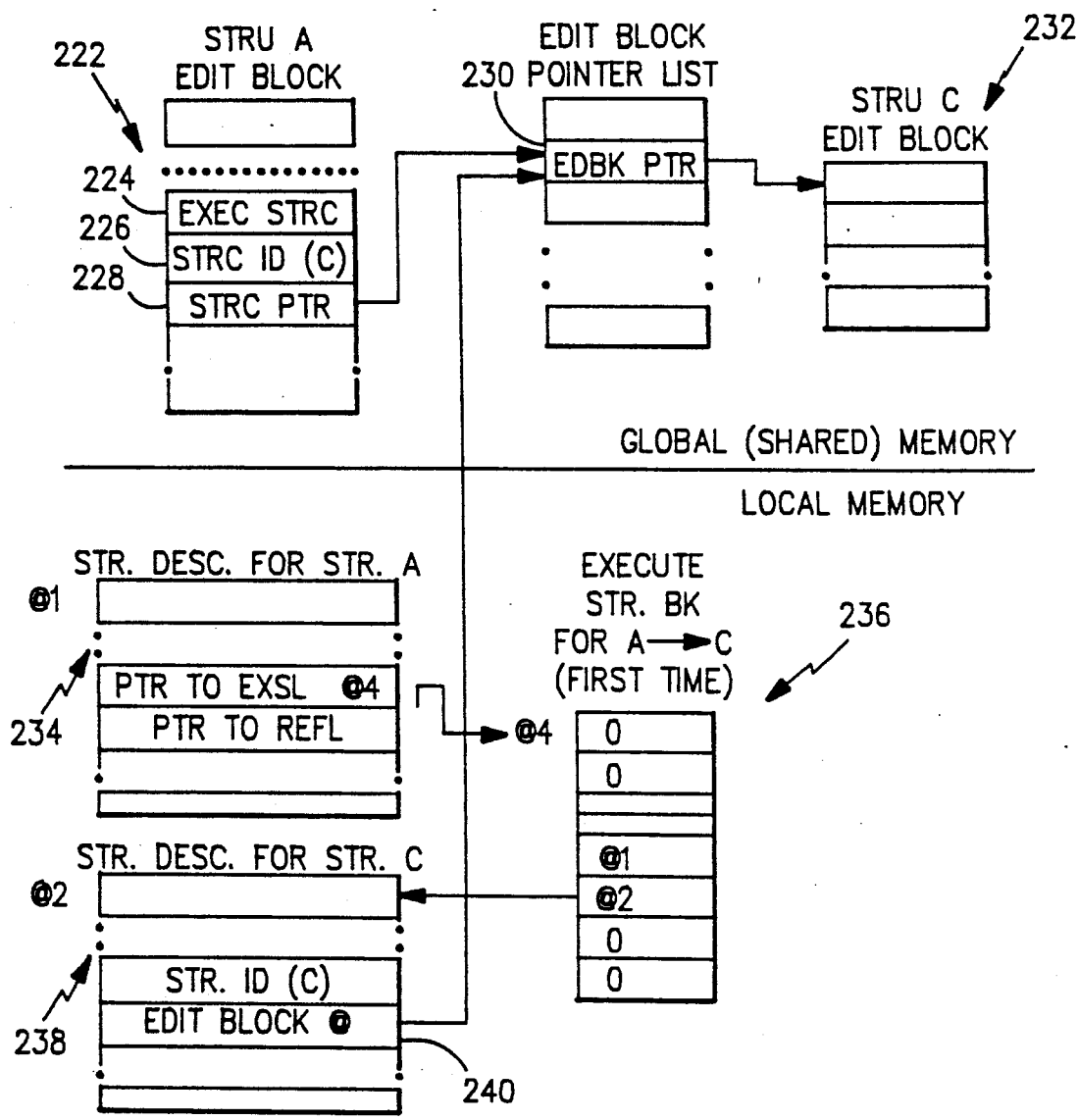
FIG. 9 is a memory diagram illustrating the relationship between local and global shared memory according to the present invention.

An "edit block list" is made up of one or more variable sized edit blocks. Each edit block contains portions of the attributes or primitive structure elements for a graphic display as described above. Each edit block contains a header to identify the block and a series of structure element orders. The edit block address list is used as an address map to communicate between the storage manager and the graphics control processor. The list is made up of one or more "edit block address blocks". Each address block has forward and backward pointers plus entries pointing to the first edit block of a particular structure. This edit block address list allows structure descriptors containing most of the information required by the storage management process to reside in the local memory thereby speeding up performance. FIG. 9 illustrates this structure. Structure A edit block 222 contains the structure elements for structure A. Among these elements are execute structure command 224 which will execute the structure C (226). The following structure I.D. is an address pointer 228 that points to the edit block pointer list address for structure C (230). This pointer, in turn, points to the first edit block of structure C (232). The structure descriptor table for structure A is located in local memory at 234, @1. The structure descriptor points to the EXSL address for the execution by A of structure C. The execute structure block 236 points to the structure descriptor for the executed structure C that is contained at 238, @2. The structure descriptor for structure C contains a pointer 240 to the edit block pointer list in shared memory which, in turn, points to the structure C edit blocks. In addition, this allows the first edit block in each structure to be freely created, replaced, or deleted during structure editing without concern that the edit block may be referenced by other structures.

In the preferred embodiment, the system uses a memory management scheme to allocate memory for blocks any size, in powers of 2, up to 64 K bytes. Furthermore, it provides pools of fixed block size for the structure descriptor table for fast allocation.

The structure storage organization discussed above allows structure editing functions to be efficiently accomplished. The following structure storage editing commands are provided.

Editing control functions
  Open structure
  Closed structure
  Set element pointer
  Offset element pointer
  Set element pointer at label
  Set element pointer at pick I.D.
  Locate element at type
Structure content modification
  insert edit group
  replace edit group
  copy structure
  delete element
  delete element range
  delete element between label
  empty structure
  delete element group
Structure manipulation
  delete structure
  delete all structures
  delete structure network
  delete structure network conditionally.

The above described tables allow rapid access to the hierarchical graphics data structure for editing and update. For example, to add a structure element to an edit block, for example, to add a line to an object, the following operations would be performed.

1. Open structure (I.D.=XXXX)

The structure descriptor hash table is searched to locate structure XXXX. If the structure is not found then a new structure descriptor is created.

2. Set element pointer at label

The label I.D. hash table is searched to find the label I.D. element block and to find the label I.D. structure element within the corresponding edit block.

3. Insert edit block (up to 64 K bytes of data in the preferred embodiment)

If the current edit block has enough free space, inserted edited block is added to the current block. Otherwise, depending on the size of the inserted edit block in the current edit block, a new edit block is created by combining the two, if the total size is less than 64 K bytes, or an entire new block is created and chained to the old ones, or two new edit blocks are created splitting the current edit block and inserting the new one. Pick I.D., label I.D. and execute structure elements are handled specially. Pick I.D. and label I.D. are chained in the inserted edit block and added to the pick I.D. element block or label I.D. element block. An execute structure is added by searching through the hash table to find the executed structure, if not found, creating the associated structure descriptor table, execute structure table, and adding the pointer to the edit block address list to the data word in the edit block.

4. Close structure

Figure 10A:
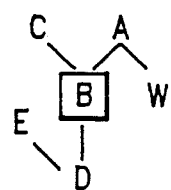
FIGS. 10a and 10b are diagrams showing the relationships between structures.
Figure 10B:
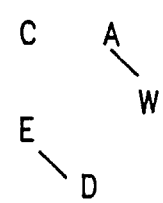

A more complex example involves the deletion of an entire structure. FIG. 10a shows the relationship between six structures. If structure B is to be deleted, the interrelationships between structure B and the other structures must be examined and corrected in light of the deletion. As shown in FIG. 10a, structure B is executed by structures C and A and it, in turn, executes structure D. Deletion of structure B includes the following step.

1. Using the REFL list for structure B, trace back to find the corresponding structures at a referencing structure B and zero the corresponding edit block entry. Delete corresponding execute structure blocks and rechain the remaining execute structure blocks in the ESXL chain.
2. Search the execute structure list (EXSL) of structure B to rechain the reference list of the executed structures.
3. Search the pick I.D. list and remove all pick I.D. blocks from the hashing chain if there is a pick I.D. in structure B.
4. Search the label I.D. list and remove all label blocks from the hashing chain that reference labels in structure B.
5. Search down the edit block and remove all edit blocks associated with structure B.
6. Remove the structure descriptor of structure B from the structure descriptor list and free the associated storage.

This simple delete structure command causes the deletion of a single structure. More complex commands such as "delete structure network" and "delete structure network conditional" can also be executed by employing a combination of these operations.

These commands make use of the above described structures and control tables to quickly access, edit, and return the relevant elements. These commands evaluate the content of the control tables when performing certain operations. For example, when the command "delete structure network conditionally" analyzes each execute structure in a referenced structure list to determine whether the structure is referenced by another structure. If so, it is not deleted. Similarly other commands to delete or replace items consider other references to that item by other descriptors.

In this way the system provides a means for rapidly and efficiently editing structure storage data.

I claim:

1. In a computer graphics system in which hierarchically arranged data structures representing graphics primitives are traversed to generate images for display, each of said data structures optionally invoking the execution of another structure, a method of linking said data structures to facilitate access thereto, comprising the steps of:

defining a separate execute structure block in memory for each instance of the invocation of one of said data structures by another of said data structures, each execute structure block being associated with an invoking structure and with an invoked structure;

for each invoking structure, linking the execute structure blocks associated with said invoking structure to form an execute structure list;

for each invoked structure, linking the execute structure blocks associated with said invoked structure to form a reference structure list.

2. A method as in claim 1 in which said lists are doubly linked lists.

3. A method as in claim 1, further comprising the step of:

defining a corresponding structure descriptor in memory for each of said data structures, each of said execute structure blocks containing a pointer to the structure descriptors defined for the invoking structure and for the invoked structure associated with said execute structure block.

4. A method as in claim 3 in which each of said data structures has a corresponding structure identifier, said method comprising the further step of:

defining a structure identifier hashing table in memory containing pointers to said structure descriptors, each of said pointers to a structure descriptor being indexed by a hash transformation of the structure identifier of the data structure corresponding to the structure descriptor.

5. A method as in claim 3 in which the structure descriptors defined for structures whose identifiers have the same hash transformation are linked to form a list.

6. A method as in claim 3, further comprising the step of:

defining for each of said data structures a first edit block and optionally one or more subsequent edit blocks linked to form an edit block list, each structure descriptor containing a pointer to the first edit block defined for the data structure corresponding to the structure descriptor.

7. A method as in claim 6, further comprising the step of:

defining an edit block pointer list containing pointers to the first edit block defined for each of said data structures, said pointers to said first edit blocks contained in said structure descriptors being indirect pointers via said pointer list.

8. A method as in claim 3 in which the structure descriptor defined for each invoking structure contains a pointer to the execute structure list formed for said invoking structure.

9. A method as in claim 3 in which the structure descriptor defined for each invoked structure contains a pointer to the reference structure list formed for said invoked structure.

* * * * *